United States Patent [19]

Claybaker

[11] 4,254,187
[45] Mar. 3, 1981

[54] PAPER PLIES IMPREGNATED WITH OIL MODIFIED PHENOLIC RESOLE VARNISH

[75] Inventor: LeRoy A. Claybaker, Coshocton, Ohio

[73] Assignee: General Electric Company, Coshocton, Ohio

[21] Appl. No.: 745,733

[22] Filed: Nov. 29, 1976

Related U.S. Application Data

[62] Division of Ser. No. 562,526, Mar. 27, 1975, Pat. No. 4,043,954.

[51] Int. Cl.$^3$ .............................................. C08L 91/00
[52] U.S. Cl. ................................... 428/498; 428/499; 428/535; 428/537
[58] Field of Search ...................... 428/498, 499, 535; 498/537; 260/19

[56] References Cited

U.S. PATENT DOCUMENTS

| | | | |
|---|---|---|---|
| 2,744,013 | 5/1956 | Dorland et al. | 428/499 |
| 3,352,744 | 11/1967 | Elmer et al. | 428/535 X |
| 3,620,902 | 11/1971 | Anderson et al. | 428/535 X |

*Primary Examiner*—Marion McCamish
*Attorney, Agent, or Firm*—Morgan, Finnegan, Pine, Foley & Lee

[57] ABSTRACT

The invention relates to oil-modified phenolic resole varnishes particularly useful for impregnating paper laminates. Specifically, the invention relates to such compositions in which an economical and useful mixture of alcohols is used as the reaction medium for the resole formation. Laminates prepared using the varnish are characterized by salutary qualities.

5 Claims, No Drawings

PAPER PLIES IMPREGNATED WITH OIL MODIFIED PHENOLIC RESOLE VARNISH

This is a division, of application Ser. No. 562,826 filed Mar. 27, 1975 now U.S. Pat. No. 4,043,954 issued Aug. 23, 1977.

COMPOSITIONS AND LAMINATES MADE THEREFROM

This invention relates to oil-modified resole varnishes. More particularly, the invention relates to such varnishes which are prepared using an economical and useful mixture of alcohols as the reaction medium for the resole formation and to laminates prepared using the resulting varnish as an impregnant.

The preparation of oil-modified phenolic resole varnishes or phenol aldehyde resole varnishes is well known. Typically, a phenol moiety such as phenol, cresylic acid or other similar material and mixtures thereof are reacted with a suitable oil such as tung or china wood oil in the presence of a strong acid such as concentrated sulfuric acid or phosphoric acid, the alkylated oil then being reacted in a suitable, usually alcohol, solvent with an aldehyde moiety in the presence of amine or base material which serves to neutralize the excess strong acid and catalyze the resole formation.

A widely used solvent for the resole formation has been ethyl alcohol, such solvent controlling and facilitating the reaction to provide the desired cure in the final material which typically, for the preparation of paper laminates, is measured by a 150° C. stroke cure of from about 180 to 210 seconds. It was found that the use of an all-methyl alcohol solvent resulted in cure rates which were unacceptably slow for use in preparing laminates, such material resulting in a stroke cure usually of about 350 to 400 seconds at 150° C. Conversely, when isopropyl alcohol was used as the reacting medium, stroke cures of the order of 100 seconds or less were obtained. It became important with the increasing scarcity of solvents such as ethyl alcohol, to seek other more economical and more readily obtained solvents which would accomplish the same purpose, and a primary object of this invention is to provide resole varnishes of the type concerned as well as products resulting from their use in which readily available substitute solvents are used as the resole reaction medium, and it is a primary purpose of this invention to provide such materials and a procedure for preparing them.

It was unexpectedly found that in the preparation of resoles as outlined above, a mixed solvent consisting of, by weight, from about 15 to 50 percent methyl alcohol and 85 to 50 percent isopropyl alcohol would act in a manner comparable to ethyl alcohol taken alone, providing a final material having a suitable cure rate and other properties.

The preparation of resoles is well known. Typically, phenol or cresylic acid or mixtures thereof in any proportions are combined with a concentrated acid such as sulfuric acid or phosphoric acid and heated to a temperature of approximately 35° C., there then being added over a suitable period tung oil, the amounts of ingredients being such that the acid constitutes, by weight, from about 0.3 percent to 1 percent of the total mixture and the tung oil constitutes, by weight, from about 15 to 40 percent of the total mixture, the remainder being the phenol moiety. The mixture of phenol acid and tung oil is heated at a temperature of from about 115° C. to 120° C. for about 30 minutes, and cooled to about 90° C. at which point 20 to 34 parts of mixed methyl and isopropyl alcohol of the above proportions is added per 100 parts of the other ingredients. The mixture is then cooled to a temperature of about 65° C. at which point the diamine, such as ethylene diamine, 1,3 propane diamine hexamethylene tetramine, etc. is added followed by the addition preferably of paraformaldehyde in the amount of 19 to 20 parts by weight per 100 parts by weight of the remainder of the ingredients. At this point the mixture is again heated to reflux temperature and held there for a period of about one hour, at which point the stroke cure is checked and adjusted by further reaction if necessary, the mixture finally being cooled with the addition of final solvent to the desired viscosity and specific gravity. Typically, methyl alcohol in the amount of about 9 parts by weight is used for each 100 parts by weight of resole reaction product.

While paraformaldehyde is used as the aldehyde moiety, it will be realized that other non-water-containing aldehydes can be used, such as the Methyl or Propyl Formcels, which are solutions of formaldehyde in the corresponding methyl or propyl alcohol. Formaldehyde as such is not preferred since it contains water, the excess of which then has to be removed.

The following example illustrates the present invention, it being realized that it is to be taken as exemplary only and not as limiting in any way. All parts are by weight.

There were mixed together 495 parts of phenol and 495 parts of cresylic acid along with 9.6 parts of sulfuric acid, the mixture being stirred and heated to a temperature of 35° C. at which point there were added over a period of about 5 minutes 594 parts of tung oil with further mixing and heated to a temperature of 115° C. to 120° C. which was held for about 30 minutes. The alkylated mixture was then cooled to about 90° C. and 401 parts of a 50—50 by weight mixture of methyl and isopropyl alcohol added, further cooling being maintained until a temperature of 65° C. was reached. Then there were added 27.7 parts of 1,3-propane diamine followed by the addition of 396 parts of paraformaldehyde. At this point the mixture was once again heated to reflux temperature and held at reflux for about one hour, at which point the stroke cure was tested. Finally, there was added a final portion of 231 parts of methyl alcohol to adjust the viscosity and specific gravity. Other preparations were made using as the mixed alcohol portion various proportions of methyl alcohol and toluene in weight proportions of respectively 50—50, 50—50 and 75-25. It was found that the 150° C. stroke cures for these preparations were respectively 199, 120 and 345 seconds indicating little or no control over the cure rate of the final material, perhaps indicating that the aromatic hydrocarbon of the toluol interferes in the reaction. When methyl alcohol and Methyl Cellosolve, or the monomethyl ether of ethylene glycol, were used in proportions respectively of 50—50, 25-75 and 75-25, the respective 150° C. stroke cures were 204, 119 and 325 indicating that within a limited range such compositions could be useful but still not broadly so.

However, from an economical viewpoint it was found that a mixed solvent consisting of by weight from 15 to 50 parts of methyl alcohol and 85 to 50 parts of isopropyl alcohol gave final 150° C. stroke cures of suitable range. For example, a 30 methyl alcohol to 70 isopropyl alcohol mixture gave a stroke cure of 201 seconds; 25 ethyl alcohol to 75 isopropyl alcohol gave a stroke cure of 210 seconds; 20 methyl alcohol to 80 isopropyl alcohol gave a stroke cure of 202 seconds; and these preparations of 15 methyl alcohol to 85 isopropyl alcohol gave stroke cures of 193 seconds, 207 seconds and 203 seconds when used along with the indicated quantity of 1,3-propane diamine. The most preferred proportion of mixed solvents is about 37.5 parts by weight of methyl alcohol to about 62.5 parts by weight of isopropyl alcohol.

As pointed out above, paper laminates prepared from the above varnishes have salutary and desirable characteristics. In preparing the impregnating material, the above varnish is with the addition of desired flame retardant materials, modifiers and fillers used to impregnate paper laminae to a resin content of about 60 percent by weight. A typical impregnating composition consists of about 1250 parts of the above resole varnish, 20 parts of triphenyl phosphate, and 60 parts of antimony trioxide as flame retardant materials along with about 100 parts of a barium hydrate, catalyzed phenol-formaldehyde resin of low viscosity to facilitate penetration of the paper along with about 220 parts of an epoxy resin prepared from a tetrabromobisphenol-A having a molecular weight of about 1100, there being added from about 3 to 30 parts of acetone or other suitable solvent to further adjust the viscosity. When four layers of 22 mil thick cotton linter or bleached kraft paper were impregnated as by brushing, dipping and the like to a dried resin content of 60 percent and consolidated at a pressure of about 1350 psi and a temperature of about 150° C. for about 30 minutes, the moisture absorption of the final laminate tested according to NEMA LI 1-10.17 test D-24/23 was 0.57 percent, the NEMA LI 1-10.20 flexural strength was 20,600 psi lengthwise and 16,500 psi crosswise. The dimensional stability tested according to MIL-P 55617A test was 0.00014 inch per inch lengthwise and 0.00017 inch per inch crosswise. The insulation resistance according to ASTM test EIA C-96/35/90 was from about 853,000 to 1,080,000 megohms. The dielectric strength at D-48/50 S/T was 60 KV surface failure and the S/S dielectric strength was 50 KV surface failure. The peel strength after dipping in solder for five seconds at 500° F. was 1100 lbs/inch. The laminate was also satisfactorily resistant to solvent such as isopropanol, trichloroethylene and mixtures of methyl chloride and ethyl alcohol.

There are provided, then, by the present invention resole materials which are readily made using economical and available solvents. There are also provided useful laminates made using such resole varnishes as an impregnant.

What I claim as new and desire to secure by Letters Patent of the United States is:

1. A laminate of a plurality of paper plies having as the impregnating varnish a product made by (a) reacting a phenol moiety with tung oil in the presence of strong acid and (b) reacting the product of (a) in an alcohol solvent with an aldehyde moiety in the presence of an amine catalyst using as the alcohol solvent a mixture consisting of, by weight, from 15 to 50 percent methyl alcohol and 85 to 50 percent isopropyl alcohol, the reaction product of (b) being dissolved in a solvent.

2. The product of claim 1 where said phenol moiety is a mixture of phenol and cresylic acid.

3. A laminate as in claim 1 wherein said acid is selected from sulfuric and phosphoric acids.

4. A laminate as in claim 1 wherein said aldehyde moiety is paraformaldehyde.

5. A laminate as in claim 1 wherein said amine is selected from 1,3-propane diamine and ethylene diamine.

* * * * *